Sept. 23, 1969 J. W. PEDLOW 3,468,771
POLYURETHANE FOAM STRUCTURE WITH POLYVINYL-CHLORIDE COATING
Filed April 12, 1966
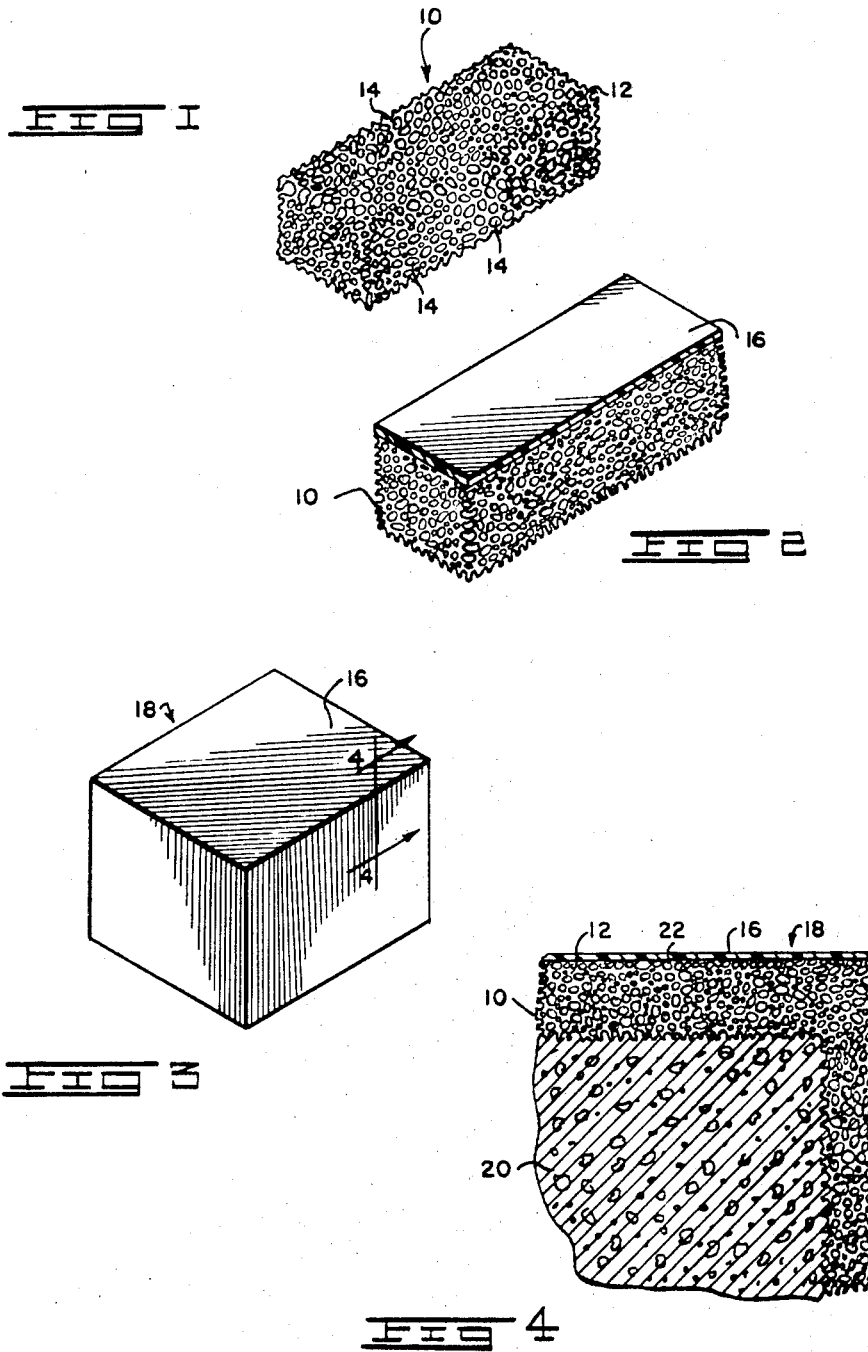
Inventor
JOHN WATSON PEDLOW
By McLean, Morton & Boustead
Attorneys

United States Patent Office 3,468,771
Patented Sept. 23, 1969

3,468,771
POLYURETHANE FOAM STRUCTURE WITH POLYVINYL-CHLORIDE COATING
John Watson Pedlow, Chester, Pa. (% Quelcor, Inc., Paper Mill Road and Baltimore Pike, P.O. Box 33, Media, Pa. 19063)
Filed Apr. 12, 1966, Ser. No. 541,994
U.S. Cl. E04c 1/04, 1/40
U.S. Cl. 52—309    15 Claims

ABSTRACT OF THE DISCLOSURE

An extensively, open-celled polyurethane resilient foam skeleton is coated with cured polyvinyl-chloride. The coated foam also has an open-celled structure, for instance, which can be about 50 to 95% open. The foam is laminated to sheet polyvinyl-chloride and the resulting product can be anchored to various materials, for instance, concrete, which set below the decomposition temperature of the polyvinyl-chloride sheet-foamed laminant and such lower temperature setting materials penetrate the internal pores of the foam.

---

This invention is a novel composition of matter and a method for making it. Articles embodying this invention have outstanding strength and chemical resistance and are of value as structural materials and in other uses. In one aspect this invention is drawn to a concrete structure or structural element having an anchored, chemically-resistant facing of polyvinyl chloride resin. In other aspects, this invention is drawn to the anchorable polyvinyl-chloride resin facing, to the open-celled foam which forms the anchor, and to a method for making the structural materials.

Concrete structural elements are of great utility where strength, economy and flexibility of form are desired; however, such elements are subject to chemical attack in such applications as electrolytic metals refining cells, flooring for chemical process plants, electroplating tanks, storage tanks for phosphoric, sulfuric, etc. acids, concrete grave vaults and chlorine and chlorine dioxide cells. Besides freedom from chemical attack, articles embodying this invention present a smooth non-porous surface to inhibit bacterial accumulation in, for example, sewer conduits, and inhibit the accumulation of radio active material in nuclear hot cells. In this invention the polyvinyl-chloride facing is anchored at a great many points randomly scattered across the underside of the facing, thereby preventing buckling or wrinkling of the facing.

Although polyvinyl-chloride (PVC) sheeting is available for such facing purposes, the means currently used to anchor the sheet to the concrete element are frequently not satisfactory for some types of concrete structure. One sheeting material of the art, for example, bears on the side to be anchored, elongated T-shaped projections heat-sealed to the sheeting material parallel to each other at about 2½ inch intervals. Each T is arranged perpendicular to the sheet and is perhaps about ⅜ inch high. When a concrete structural element is cast against such a sheeting, although the T's serve to anchor the sheeting, they also interrupt the continuity of the concrete to this extent and therefore the objects cannot be prestressed throughout the depth of the concrete, which is required in concrete tank and many other structural applications. Further, upon expansion and contraction, the anchor lines of such facing materials become clearly visible and lead to a "scrubboard" appearance.

In this invention the anchoring material is an open-cell polyurethane foam which has relatively large cells and a coating of polyvinyl-chloride. The anchoring material is self-laminated to the PVC facing sheet, that is, the laminate is manufactured by a process which joins the PVC anchoring material coating integrally to the PVC facing sheet. The bond between the facing sheet and the anchor coating is therefore a strong bond utilizing cohesive forces, rather than the usually much weaker bond resulting from forces of mere adhesion.

The anchoring material combines the chemical resistance of PVC with unusual strength and "openness." The material has a lack of bulk which enables concrete, when cast with the facing, to penetrate the anchoring material, perhaps under the influence of vibrations, and to set or harden in, around and through the anchoring material. In the anchored area the finished structural element generally has a larger amount of concrete than it does of anchoring material; perhaps as much as about 50 to 95% of the matter in the anchoring layer area may be concrete, corresponding to the use of anchoring material having about 50 to 95% by volume of void space. Even with a very large percentage of void space, above about 80%, the structure of the anchoring material is one of intrinsically great strength and tear resistance.

The anchoring material, as pointed out above, is a polyvinyl-chloride-coated open-cell polyurethane foam. The cells of the open-cell, cellular, foamed, polymeric polyurethane skeleton are reported to be generally in the form of dodecahedrons with each of the twelve faces broken and usually representing a pentagon. Of course, throughout the skeleton, cell structures representing slight variations from this are generally found. The PVC coating appears to gather at the angles and corners of this skeleton instead of evenly coating the entire cell surface. This tends to eliminate angles, which are relatively weak, giving an anchoring material which may be considered to consist essentially of a great many generally closed circles of coated polyurethane integrally bonded with each other, both at the polyurethane and PVC levels, the PVC coating forming minute arches at the junctures of the circles. Adjoining circles are generally in different, though intersecting, straight or curved planes and, although the size of the circles may vary, they generally are fairly well confined to a small range. A valuable property of the anchoring material is that it displays excellent tear resistance even when the circles are large. The structure provides for a tearing resistance which is matched, for example, in a fibrous material, only by much bulkier objects.

The invention will be better understood by reference to the accompanying drawing in which:

FIGURE 1 is a perspective representation of the anchoring material of the invention;

FIGURE 2 is a perspective view of a portion of anchorable polyvinyl-chloride facing material;

FIGURE 3 is a perspective view of a concrete structural element having an anchored polyvinyl-chloride facing; and FIGURE 4 is a fragmentary cross-sectional view of the structural element along the line 4—4 of FIGURE 3.

The anchoring material 10, as illustrated, comprises a honeycomb or web-type skeletal structure formed by the polyvinyl-chloride-coated polyurethane foam matrix elements 12 which are joined together, leaving the voids 14. The greater volume of the anchoring material generally comprises the void space, and the PVC content of the anchoring material may be from about 1 to 4 times that of the polyurethane foam by weight.

To form the facing material the anchoring material 10 is bonded to the polyvinyl-chloride sheet 16. The structural element 18 comprises the concrete body 20, having the facing 16 anchored to it by the anchoring material 10. It will be observed that in the embodiment illustrated the polyvinyl-chloride-coated polyurethane elements 12 form an interconnected network through the concrete material 22 which occupies the formerly void space.

Open-cell polyurethane foams are known articles of commerce. They generally are produced by simultaneous polymerization and foaming, due to release of carbon dioxide, of a mixture of a polyisocyanate material, a glycol-containing material, and water. The polyurethane is characterized chemically by having recurrent urethane

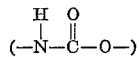

linkages connecting linear units containing hydrocarbon groups of varying carbon contents and chain lengths. When a polyester resin, for example, an alkyd resin, is used as the glycol-containing material, the hydrocarbon chains may be interrupted by stable carboxylic ester linkages. Generally, a catalyst, often a basic amine, is included in the reaction mixture to regulate the speed and extent of cell formation and an emulsifier such as a polyoxyethylated vegetable oil also is often included. The resulting foam is the honey-combed, connecting-void open-celled material described above. The proportion of closed cells in the skeleton is generally quite small. To prepare a polyurethane foam for use as the skeleton of the anchoring material of this invention, the foaming is generally regulated to give a pore size as large as possible consistent with the strength required in the skeleton. A pore size of about 5–30 broken cells per inch is suitable and a range of about 5–10 per inch is preferred. The polyurethane foam will frequently be about 90–97% void space. The polymerization product is cured, for example, by treatment in an oven at a temperature which may vary from slightly above room temperature to about 200° F. Where the product has an undesirably high number of unbroken cells, a treatment may be performed on it, before or after curing, with an agent which attacks the polyurethane. The cell walls being the thinnest and therefore the most quickly destroyed part of the foam, such treatment, properly handled, does not break the essential elements of the skeleton. The skeleton is a generally resilient web and polyurethane in such a form maintains its integrity throughout the subsequent processing required to produce the article of this invention.

The polyurethane open-cell foam skeleton may be coated with polyvinyl-chloride by any one of a number of different processes as will be apparent to one of ordinary skill in the art. For example, a polyvinyl-chloride plastisol may be rolled into the skeleton in an amount sufficient to coat the skeleton elements to the desired extent, and give the anchoring material the desired content of PVC.

The term "PVC plastisol" is used to describe a dispersion of resinous materials in a plasticizer. Fine-particle size polyvinyl-chloride is the essential resinous constituent of the plastisol, but other resinous materials may be included in the plastisol to give special properties. For example, acrylic monomers or pyromellitic dianhydride in combination with epoxidized materials may be employed to give a less resilient coated product; such a product is usually harder, more rigid and more temperature-resistant than coated foams produced from plastisols containing PVC as the only resin. The plasticizers can be, for example, phthalic, citric, adipic, sebacic or other acid diesters of long chain alcohols. Certain aromatic petroleum derivatives and chlorinated hydrocarbons may be used as the plastisol dispersant. Epoxidized and polymeric materials may also be used. Heat stabilizers, viscosity regulators, fillers and pigments may be included in the plastisol. It is also sometimes desirable to reduce the viscosity of the plastisol by the use of a volatile solvent.

In one mode of PVC plastisol application to the open-cell polyurethane foam skeleton a PVC plastisol of the desired composition is applied to a conveyor belt, the depth of this layer being regulated by a doctor blade. This layer should be uniform in depth and should contain the amount of coating necessary to satisfy the requirements set for the coated foam. This conveyor belt passes a point where the skeleton is placed on top of it, preferably from a roll of the foam. Then the conveyor belt passes between pairs of compression rolls, or under compression rolls which squeeze plastisol and foam against the belt which is held rigid by a back-up plate which is under the belt. In the process of squeezing, the PVC plastisol becomes well distributed through the mass of foam and the alternate compression and expansion of the foam also rupture skins of wet plastisol which might bridge across the cell faces. In the case of thick foams, a layer of plastisol may be placed on top of the foam as well as below it before or between the compression rolls. The coated foam is then heated to a temperature in the range of 300 to 350° F,. depending upon plastisol composition, when it is desired to fully cure the PVC, but the temperature should not be high enough to harm the product. The heat may be applied by direct heating elements such as infrared lamps, or, especially in the case of thicker foam sections, a forced heated air circulation through the foam and conveyor belt may be provided. The air may be heated to as high as about 500 to 600° F. The curing of the PVC coating is practically instantaneous at this temperature. It may sometimes be found desirable to cure the PVC coating less than fully by lowering somewhat the temperature of curing. The PVC coating, before full curing is achieved, may be found to be more susceptible to integration into the contiguous portion of PVC facing layer later added, thus giving a stronger bond between the layers. The coated foam, after cooling to about 100 to 150° F. to prevent sticking, may conveniently be sent to take-up rolls.

The PVC coated foam, besides its utility as an anchoring material in this invention is also of value in the filtering art as a fume scrubber entrainment separator or packing, as a filter cloth spacer or as an air filter where strength and chemical resistance are required along with light weight and any desired degree of rigidity or hardness. Also, the polyvinyl-chloride-coated open-cell polyurethane foam has a slightly abrasive surface, so that it may be installed on horizontal surfaces to soften them and deaden sound while giving a non-slip surface which resists wear and corrosive environments. Another application is in the manufacture of sound deadening acoustical members. Polyvinyl-chloride plastisol being available in an almost unlimited variety of colors, the foam product may also have these colors.

The anchorable PVC facing material used in this invention is a polyvinyl-chloride-coated open-cell polyurethane foam bonded to PVC sheet. In practical operations the normal thickness of the foam is about an inch or less while the sheet varies in thickness generally from about 0.005 to 0.18 inch or more. Generally, the foam will be about ⅛ inch to 3/16 inch in thickness, and usually be no more than about four times the thickness of the sheet. The hardness of the sheet may vary from as low as 10 Durometer on the A scale up to about 85 on the Durometer D scale. The sheet thickness, hardness, color, etc., is generally selected with regard to its ultimate use. Besides its use in making PVC faced concrete structural elements, the laminate provides a resilient and/or insulating surfacing material of superior strength and deterioration resistance. Such sheet material can provide ready cleanability when installed on building surfaces and also provides a readily installed heat or sound insulating covering, as well as a chemically resistant table, sink, or shelf top. The PVC-backed, PVC-coated foam makes an ideal diving board cover, or anti-slip floor covering for tubs, showers, walkways.

The laminated sheet material may be made by a continuous process by forming a layer of PVC plastisol of desired characteristics on, for example, a conveyor belt coated with silicone or fluorohydrocarbons to prevent the PVC from sticking. This may be done by casting from a feed hopper and knife coating the belt, by spraying plastisol evenly on the belt with airless, high pressure equipment, etc. A layer of about 0.005 inch to 0.1 inch is usually suitable. This layer is gelled by raising the plastisol to a temperature of about 200–225° F. Gelation of the plastisol before lamination is essential to avoid absorption of the plastisol layer into the foam during lamination, interfering with regulation of the facing thickness. The gelling may leave an ungelled portion, say up to about 0.01 inch thick at the top of the layer to which the coated foam is is to be laminated, or an additional ungelled plastisol layer about 0.005 inch to 0.01 inch thick may be coated onto the gelled layer. In casting PVC films thicker than about 0.1 inch it may be desirable to employ a continuous dam on either side of the conveyor belt to confine the plastisol until it gels or it may be preferable to regulate the viscosity of the plastisol to prevent it from flowing.

After cooling the gelled layer to about 150–175° F., or at least below the gelling temperature range, for example, by means of a blast of cool air, the polyvinylchloride-coated open-cell polyurethane foam is applied, for example, continuously from a roll, to the ungelled layer, and pressed into the wet plastisol by the use of one or a plurality of rollers etc. Final curing of the facing skin and completion of the cohesive bond takes place in a heating zone which preferably makes use of infrared lamps or other radiant heaters to effect a minimum temperature of about 325° F.±25° F. on the skin or facing layer. The heating zone can be enclosed and recirculation of hot air provided, for more efficient operation. After cooling the facing and anchoring material, the laminate may be rolled up or cut into slabs of convenient length for their intended use. It is also feasible to repeat this processing to put a PVC sheet facing on both sides of the foam if such is desired. Such sandwich materials are of use, when a rigid foam is used, as acid-resistant table tops, etc.

It also may sometimes be desirable to use as the conveyor belt itself, or as the top layer of the conveyor belt onto which the PVC facing layer is cast or sprayed, strong paper or similar material, preferably coated with a silicone or epoxy resin to provide for ready subsequent removal of the paper from the facing. The PVC facing material thus produced is protected by the paper and furthermore, the paper provides a medium by which the facing material may be easily adhered to the inside of a mold or forms for subsequent casting operations; when the mold or forms are removed the paper readily releases itself from the PVC facing material.

Concrete structural elements lined or coated with the anchored PVC facing of this invention may be manufactured by contacting settable concrete with the foam side of the sheet-foam laminate, vibrating the foam and/or concrete to provide penetration of the concrete into the void space of the foam, and allowing the concrete to set.

When using conventional flat forms, the laminate is placed with the PVC facing toward the form, and concrete is poured and vibrated over the foam side and left to harden with or without prestressing during the hardening. Finished faced concrete slabs may then be assembled to make PVC-lined concrete cells, such as for electrolytic metals refining, electroplating tanks, etc., using anchor bolts to connect the individual slabs and heat-sealing PVC sheets over the seams and corners or curing PVC plastisol in-situ at the seams and corners.

Cells and troughs may be given a seamless PVC facing in this same manner by putting the laminate around the form and casting the concrete against the foam. It may be desired to use a temporary adhesive to secure the facing to the mold form during the process. Also, such articles may be made by spraying or dip-coating a PVC plastisol of desired thickness on a wooden, plaster or metal form which has been treated with a mold release composition and placing the coated form in an oven at about 200–225° F. to gel the plastisol. Another thin coating of PVC plastisol may be applied to the gelled coat as explained above. Then a layer of PVC coated open-cell polyurethane foam perhaps ³⁄₁₆ inch in thickness is applied and the form, sheet and foam are placed once more in an oven, this time to cure at about 350° F.±15° F. After curing and cooling, concrete may be poured over the anchoring material layer, vibrated and allowed to set. The form is then removed.

An anchored PVC facing may be given to freshly poured concrete on floors and other horizontal surfaces by using a soft top mix, placing the laminate foam-side-down on the concrete and displacing air by going over the surface with a roller vibrator. In some structural applications it may be desirable to present a somewhat resilient PVC surface, for example, where the PVC surface needs to withstand much mechanical abuse. Such a surface may be produced by vibrating the poured concrete insufficiently to make it penetrate the complete depth of the foam. Also, the anchorable PVC facing material may be such that the cells adjacent the PVC sheet are smaller or have their walls broken to a less extent than cells more remote from the PVC sheet. This may be accomplished by the use of two layers of polyurethane foam, having the desired characteristics, both of which are preferably simultaneously coated with the PVC.

The concrete composition is chosen with a view to providing the desired characteristics in the final object. The aggregate used in the composition is preferably fine enough to penetrate the pores of the foam, or in any event, does not prevent finer-grained materials from entering and filling up the pores when subjected to the vibrations. Besides concrete, other moldable materials which set below the decomposition temperature of the PVC sheet-foam laminate, such as plaster-of-paris, resinous, wax or bituminous materials may be used.

As pointed out, objects embodying this invention can be manufactured having a wide variety of finished characteristics. The number of pores per square inch in the foam may be regulated to give the desired spectrum of penetrability, rigidity, and strength. The hardness, color and thickness both of the foam coating and the facing sheet may be regulated by the composition and application of the PVC plastisol.

EXAMPLE

The following example illustrates but does not limit this invention. A steel conveyor belt 12 feet wide is coated with a 0.02 inch thickness of PVC plastisol from a hopper by the use of a knife spreader. The belt is advanced to a point where an open-cell polyurethane foam is fed to the coated conveyor from a delivery roll. The foam contains about 10 cells per inch and is about ¼ inch thick. The belt passes between a back-up plate which is coated with polyethylene to reduce friction and compression rolls which squeeze the foam into the plastisol, distributing the plastisol throughout the mass of foam and rupturing any plastisol skin formed across cell faces. The coated foam passes to a mesh conveyor belt coated with a silicone polymer and passes under infrared lamps which bring the coated foam to a temperature of about 325° F. for curing. After curing the foam is cooled to about 100° F. and taken up on a roll.

Another steel conveyor belt 12 feet wide and coated with a release agent is coated with a PVC plastisol layer about ¹⁄₆₄ inch thick and sent through a zone where infrared heaters impart a temperature of about 225° F. to the plastisol to gel it. The gelled layer is cooled to about 150° F. and a layer of plastisol about ¹⁄₂₀₀ inch thick is applied to the gelled layer. The polyvinyl-chloride-coated foam previously prepared is applied to the top of the conveyor belt from the take-up roll and held in contact with the plastisol layer by means of rollers. The laminate is sent to an oven maintained at about 325° F. to cure the laminate. The conveyor belt then carries the laminate out of the oven for cooling in atmospheric air. The laminate is then cut into two-foot lengths.

A length of this laminate is placed, smooth-side-down, in a wooden form four inches deep. Steel reinforcing members of standard dimensions are placed in the form from wall to wall and extend through holes in the walls to conventional stressing means. Concrete is poured into the form and the form is vibrated until no more settling of the concrete occurs. The form is allowed to harden and age before the stressing means are removed and the form is released. The concrete structural element is used as part of an electroplating tank.

It is claimed:

1. An open-celled foam comprising an open-celled polyurethane resilient foam skeleton coated with cured polyvinyl-chloride, the greater volume of said coated foam, after curing of said polyvinyl-chloride coating, being comprised of open, interconnected cells formed by coated webs of said coated skeleton.

2. The coated foam of claim 1 in which the coated open-cell structure is about 50–95% open after curing of said polyvinyl-chloride coating.

3. The coated foam of claim 2 in which the open-cell urethane foam prior to application of said coating is about 90–97% open.

4. The coated foam of claim 3 in which the weight of said polyvinyl-chloride coating is about 1 to 4 times the weight of the uncoated polyurethane foam.

5. A coated foam as set forth in claim 1 in which a sheet of polyvinyl chloride is self-laminated to the coated open-cell foam.

6. The laminant of claim 5 in which a material which sets below the decomposition temperature of the polyvinyl-chloride sheet-foam laminant occupies the internal cells of said coated foam.

7. The laminant of claim 6 in which said material is concrete.

8. The laminant of claim 6 in which the coated, cured foam is about 50 to 95% open before being combined with said material.

9. The laminant of claim 8 in which said material is concrete.

10. The laminant of claim 8 in which said material occupies substantially all of the internal cells of the foam.

11. The laminant of claim 10 in which the foam prior to application of said coating is about 90 to 97% open.

12. The laminant of claim 11 in which said material is concrete.

13. The laminant of claim 12 in which said concrete is prestressed.

14. The coated foam of claim 5 in which the coated open-cell structure is about 50–95% open after curing of said polyvinyl-chloride coating.

15. The coated foam of claim 14 in which open-cell urethane foam prior to application of said coating is about 90–97% open.

References Cited

UNITED STATES PATENTS

| 2,772,194 | 11/1956 | Fisher. | |
| 3,029,476 | 4/1962 | Merck | 264—47 |
| 2,152,190 | 3/1939 | Henderson | 264—250 |
| 2,888,360 | 5/1959 | Sherts | 52—309 X |

FOREIGN PATENTS

| 220,733 | 3/1959 | Australia. |
| 228,667 | 6/1960 | Australia. |

JOHN E. MURTAGH, Primary Examiner

U.S. Cl. X.R.

52—223; 117—161; 161—161